(12) United States Patent
Biallas

(10) Patent No.: US 9,699,881 B2
(45) Date of Patent: Jul. 4, 2017

(54) DIAPHRAGM FLANGE AND METHOD FOR LOWERING PARTICLE BEAM IMPEDANCE AT CONNECTED BEAM TUBES OF A PARTICLE ACCELERATOR

(71) Applicant: JEFFERSON SCIENCE ASSOCIATES, LLC, Newport News, VA (US)

(72) Inventor: George Herman Biallas, Yorktown, VA (US)

(73) Assignee: JEFFERSON SCIENCE ASSOCIATES, LLC, Newport News, VA (US)

(*) Notice: Subject to any disclaimer, the term of this patent is extended or adjusted under 35 U.S.C. 154(b) by 236 days.

(21) Appl. No.: 14/711,824

(22) Filed: May 14, 2015

(65) Prior Publication Data
US 2016/0338187 A1  Nov. 17, 2016

(51) Int. Cl.
*H05H 7/22* (2006.01)
*F16L 23/00* (2006.01)
*F16L 23/18* (2006.01)

(52) U.S. Cl.
CPC ............ *H05H 7/22* (2013.01); *F16L 23/003* (2013.01); *F16L 23/18* (2013.01); *H05H 2007/222* (2013.01); *H05H 2007/225* (2013.01); *H05H 2007/227* (2013.01)

(58) Field of Classification Search
None
See application file for complete search history.

(56) References Cited

U.S. PATENT DOCUMENTS

| 3,022,933 | A | * | 2/1962 | Ellis | .................. H01J 27/04 313/7 |
| 3,133,227 | A | * | 5/1964 | Nunan | .................. H01J 3/02 250/281 |
| 3,473,064 | A | * | 10/1969 | Herb | .................. H01J 5/06 174/140 R |
| 6,414,331 | B1 | * | 7/2002 | Smith | .................. G21F 5/10 250/493.1 |
| 2002/0179858 | A1 | * | 12/2002 | Smith | .................. G21K 1/003 250/493.1 |

OTHER PUBLICATIONS

Westinkow et al "The mechanical desing for the darht II downstream beam transport" published in1999 LINAC conference proceedings.*

* cited by examiner

*Primary Examiner* — Douglas W Owens
*Assistant Examiner* — Srinivas Sathiraju

(57) ABSTRACT

A diaphragm flange for connecting the tubes in a particle accelerator while minimizing beamline impedance. The diaphragm flange includes an outer flange and a thin diaphragm integral with the outer flange. Bolt holes in the outer flange provide a means for bolting the diaphragm flange to an adjacent flange or beam tube having a mating bolt-hole pattern. The diaphragm flange includes a first surface for connection to the tube of a particle accelerator beamline and a second surface for connection to a CF flange. The second surface includes a recessed surface therein and a knife-edge on the recessed surface. The diaphragm includes a thickness that enables flexing of the integral diaphragm during assembly of beamline components. The knife-edge enables compression of a soft metal gasket to provide a leak-tight seal.

16 Claims, 6 Drawing Sheets

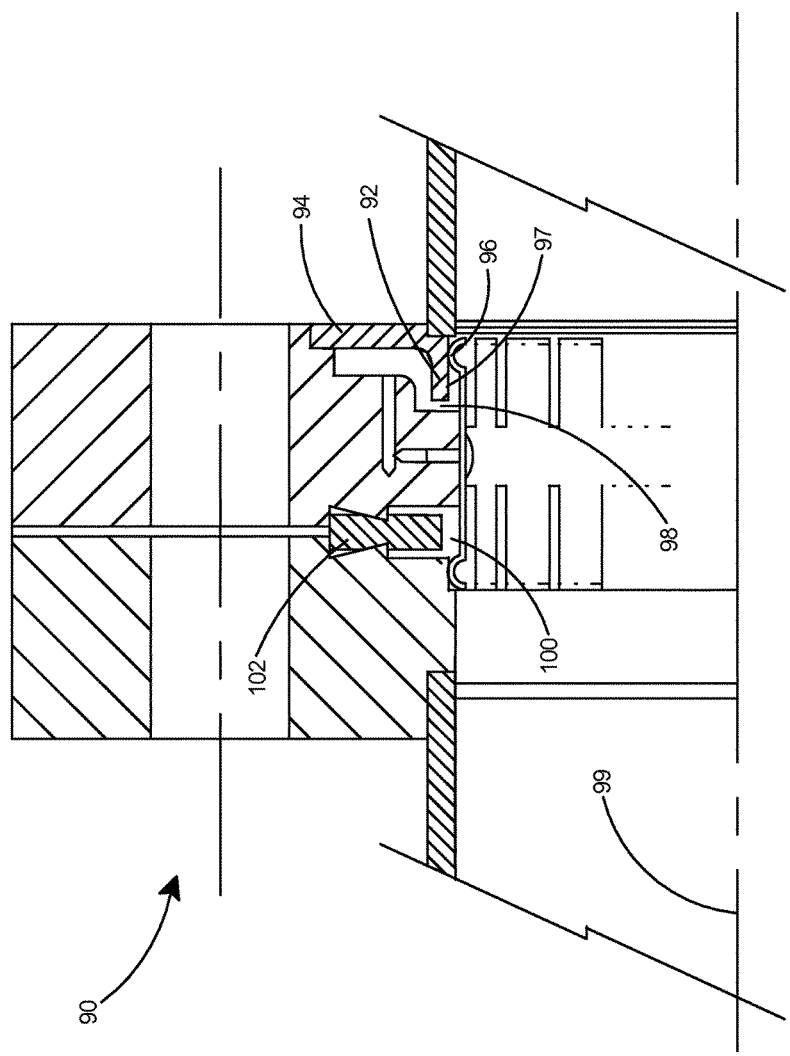

DIAPHRAGM FLANGE AND METHOD FOR LOWERING PARTICLE BEAM IMPEDANCE AT CONNECTED BEAM TUBES OF A PARTICLE ACCELERATOR

The United States Government may have certain rights to this invention under Management and Operating Contract No. DE-AC05-06OR23177 from the Department of Energy.

FIELD OF THE INVENTION

The present invention relates to particle accelerators and more particularly to devices for connecting the beam tubes of particle accelerators used for the transport of charged particle beams. The invention may be generalized to low pressure tubing and pipe systems utilizing flange connections that also require some angular flexibility.

BACKGROUND OF THE INVENTION

Particle accelerators are typically constructed of a plurality of connected tubes which must be precisely aligned as they thread through magnets and are connected to radio frequency (RF) cavities. Precise alignment is necessary in order to not be hit by the particle beam they contain. Many accelerators connect the tubes by using CF flanged joints. The tubes are occasionally disassembled and reassembled for cleaning, routine maintenance, and upgrading of components. As the tubes are typically rigid metallic structures, a flexible mechanism must be provided to align the tubes in the correct position during assembly. Often the tubes are connected and at the same time constrained by the beamline components (magnets and cavities etc.) they are associated with. Subsequently the components are aligned and the tube joints must flex in order to accommodate the motion. Particle accelerators commonly use bellows as the mechanism to provide the flexure. With reference to FIGS. 1 and 2, a bellows 10, used in a particle accelerator, typically includes deep convolutions 12 of a thin material that enable the bellows to expand or contract in length and also provide angular flexibility. The bellows 10, typically constructed of metal, include end flanges 14 and a plurality of convolutions 16 extending between the end flanges.

There are several disadvantages that must be taken into account when using a bellows to connect beamline components in a particle accelerator. Often, bellows must be internally shielded to lower the beam impedance. Beam impedance is caused as the deeply convoluted surface of the inside of a conventional bellows interacts with the strong wake fields of pulsed beams. The convolutions reflect portions of the wake field that then cause degradation of the beam properties. A bellows shield is typically made of a thin copper based, metallic tube with a series of fingers that make electrical contact to the inside of the flanges at either end of the bellow such that the interior appears to the beam pulses to be electrically smooth and not cause wake field reflections. Unfortunately, especially in an SRF based accelerator, the spring fingers rubbing on the inside of the flanges tend to generate particulates that can migrate within the vacuum tubes into the superconducting cavities and reduce their performance. Thus, for an SRF-based accelerator, the flexible element of the beam tubes should not generate particles.

Further considerations in using bellows are their high cost, the need to supply adjustable support to the flanges at both ends in order to maintain the beam tube in the defined position, the difficulties in maintaining their cleanliness and the delicacy of the thin material used to make bellows that is subject to puncture.

OBJECT OF THE INVENTION

It is therefore an object of the present invention to provide an improved apparatus and method for connecting beamline tubes in a particle accelerator.

A further object of the invention is to provide a connector device for particle accelerators that allows angular motion of connected beam tubes without compromising the beamline vacuum.

A further object of the invention is to provide a beamline connector/flexible element that is less expensive to produce than the conventional bellows-type connector.

A further object of the invention is to provide a beamline connector/flexible element that minimizes beamline impedance.

A further object of the invention is to provide a beamline connector/flexible element that does not require shielding to lower the beam impedance.

A further object of the invention is to provide a beamline connector/flexible element for SRF cavities that does not generate particulates that can migrate into the superconducting cavities and reduce beam performance.

Another object of the invention is to provide an integral diaphragm that allows the parts to be precisely aligned despite the inability to precisely weld the flanges exactly perpendicular to the assembly axis. This advantage is realized in a situation where several very large vacuum chambers with corresponding large vacuum flanges are attached to form an assembly.

A further object of the invention is to provide a diaphragm flange that may be used to connect vacuum piping in the chip manufacturing industry, eliminating bellows that may trap more particulates and to connect low pressure, flange connected piping that needs some flexibility.

A further object of the invention is to provide mechanical control of and limitations on gaps and openings that would otherwise generate significant impedances, with associated beam quality degradation.

SUMMARY OF THE INVENTION

This invention is a diaphragm flange for connecting neighboring beamline tubes in a particle accelerator. The diaphragm flange can be used in place of a bellows to enable angular motion of connected beam tubes and to minimize particle beam impedance. The diaphragm flange eliminates the deeply convoluted surface of a conventional bellows. In applications where short pulse charged beams pass through the bellows, the convolutions reflect portions of the wake fields and degrade the emittance of the beams. The diaphragm flange includes a thick outer flange and a thin diaphragm integral with the outer flange. Bolt holes in the outer flange provide a means for bolting the diaphragm flange to an adjacent flange having a mating bolt-hole pattern. The diaphragm flange includes a first surface for connection to the tube of a particle accelerator beamline and a second surface for connection and sealing to a mating CF flange. The second surface includes a recessed surface therein and a knife-edge for sealing against a metallic gasket on the recessed surface. Other gasket systems may also be used at this surface. The thin diaphragm is made to a thickness that allows small angular gimbaling of the attached beam tube during assembly and final alignment of beamline components. The thin diaphragm can be made thick enough to not compromise the integrity of the flange system under the forces due to external or internal pressure. Since the major alignment is only done a few cycles in the lifetime of the flange, portions of the materials of the diaphragm can be stressed beyond yield point without affecting the long term integrity of the flange system. The small gap in the beam tube flange system at a joint represents a large reduction in impedance over that of a bellows. However, the gap can still create some impedance in the case of very short pulsed beams. A solution to this case using a short shield is presented.

BRIEF DESCRIPTION OF THE DRAWINGS

Reference is made herein to the accompanying drawings, which are not necessarily drawn to scale, and wherein:

FIG. 9 is a sectional view of a fourth embodiment of a diaphragm flange with welded diaphragm and spring finger impedance shield added according to the present invention to eliminate beam impedance even for the shortest beam pulses.

DETAILED DESCRIPTION

Figure 1:
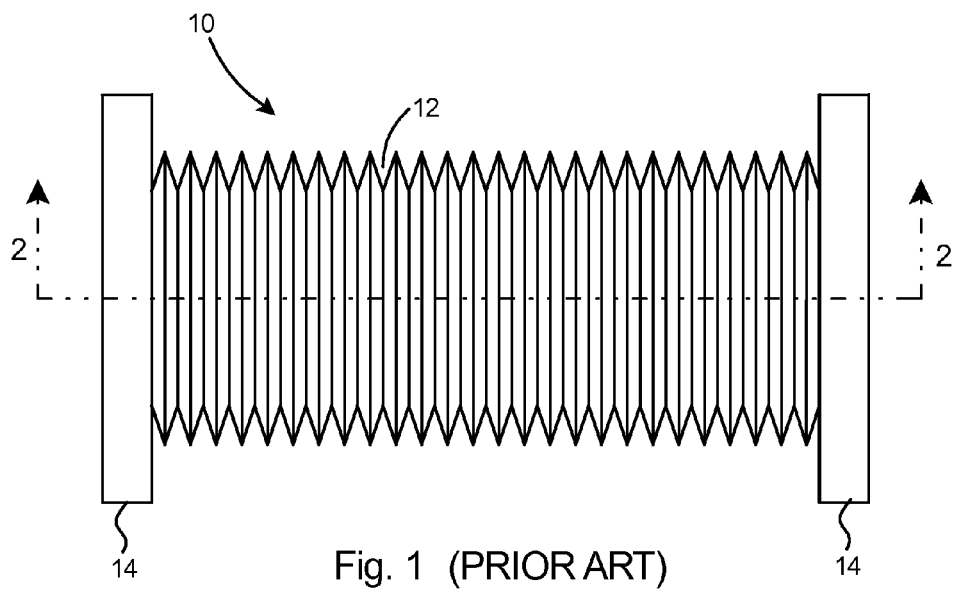
FIG. 1 is a side view of a prior art bellows for use in connecting beam tubes of a particle accelerator.
Figure 2:
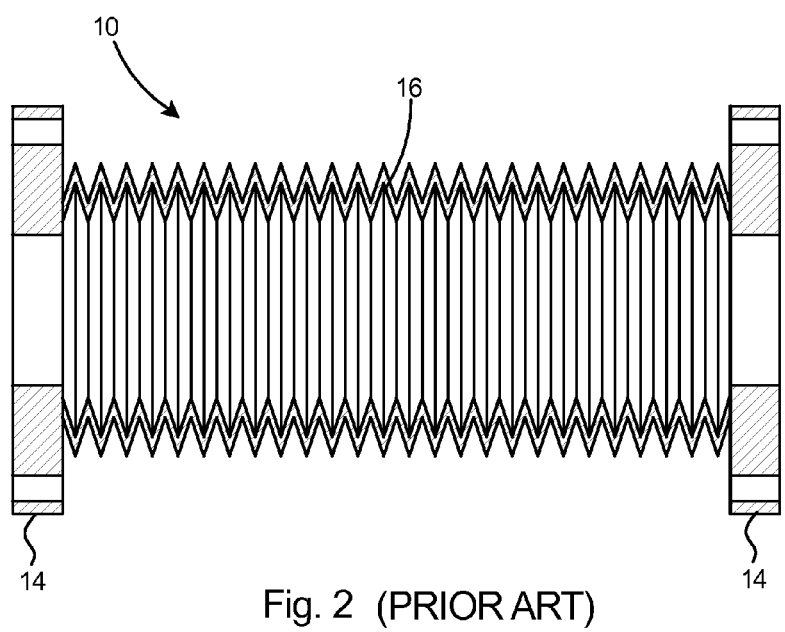
FIG. 2 is a sectional view of the prior art bellows taken along line 2-2 of FIG. 1. This view could have an impedance shield added to the inside.
Figure 3:
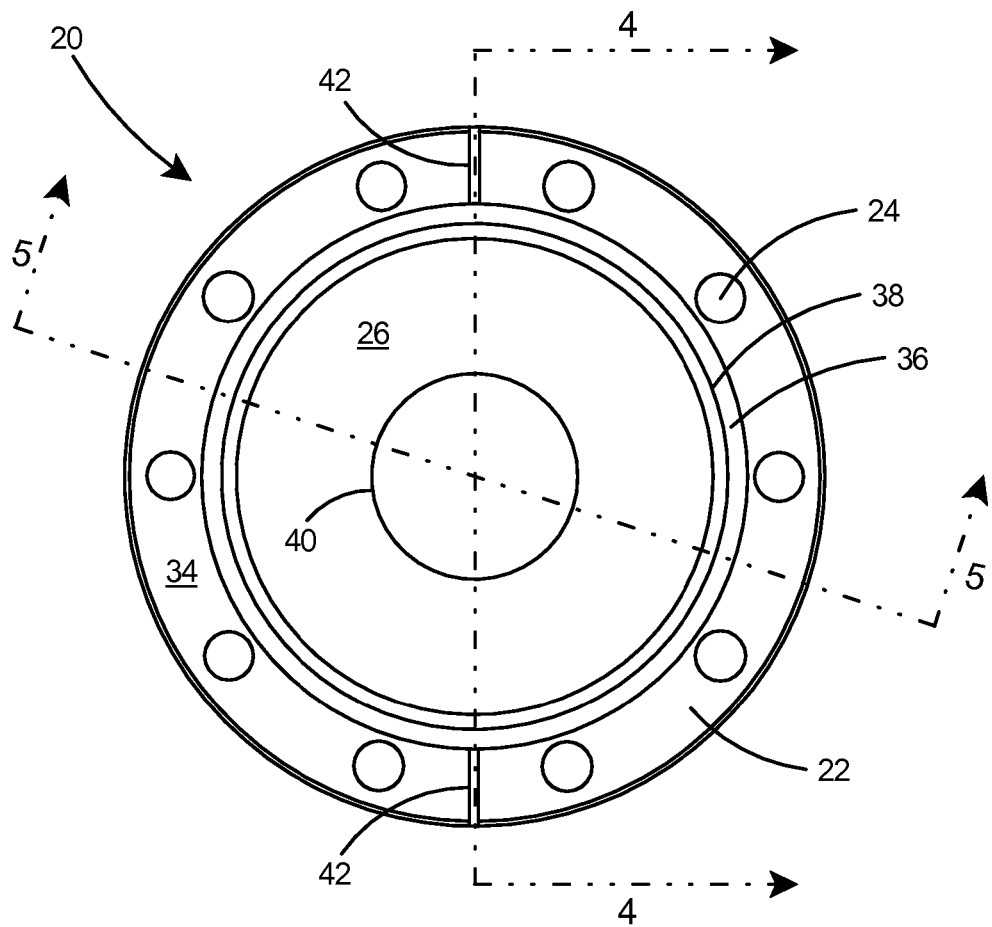
FIG. 3 is an end view of a first and preferred embodiment of a diaphragm flange according to the present invention.
Figure 4:
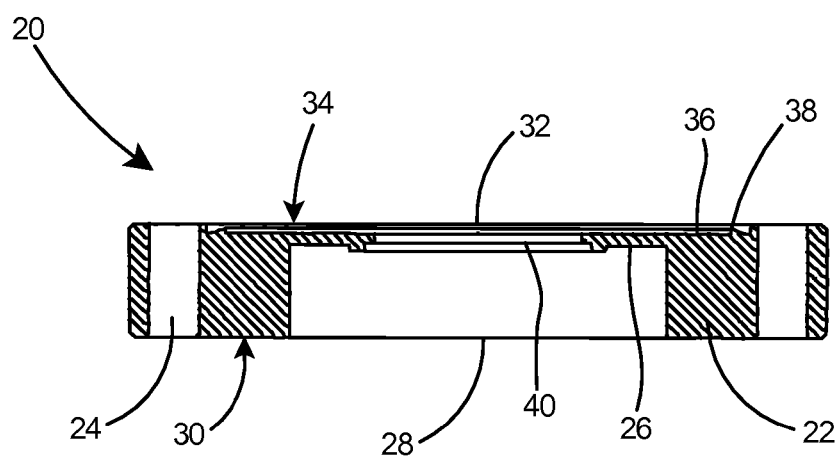
FIG. 4 is a sectional view of the diaphragm flange taken along line 4-4 of FIG. 3.

With reference to a first embodiment of the invention in FIGS. 3 and 4, there is shown a diaphragm flange 20 according to the present invention. The diaphragm flange 20 includes an annular outer ring portion 22 with one or more bolt holes 24 therein and a thin portion forming an annular diaphragm 26 integral with the ring 22. The diaphragm flange 20 includes a first side 28 having flat surface 30 and a second side 32 having a flat surface 34. A recessed surface 36 is provided on the second side 32 of the diaphragm flange. The recessed surface 36 includes an annular knife-edge 38 extending therefrom. An opening 40 is provided in the diaphragm flange to enable passage of a particle beam. Two leak check grooves 42, typically located 180 degrees apart, extend laterally across the outer ring 22.

Figure 6:
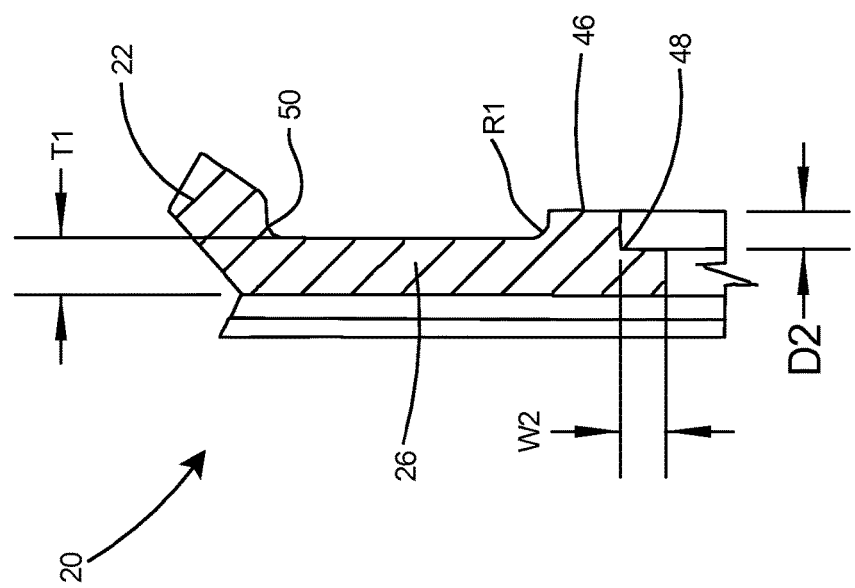
FIG. 6 is a detail view of the diaphragm portion of the diaphragm flange of FIG. 3.
Figure 5:
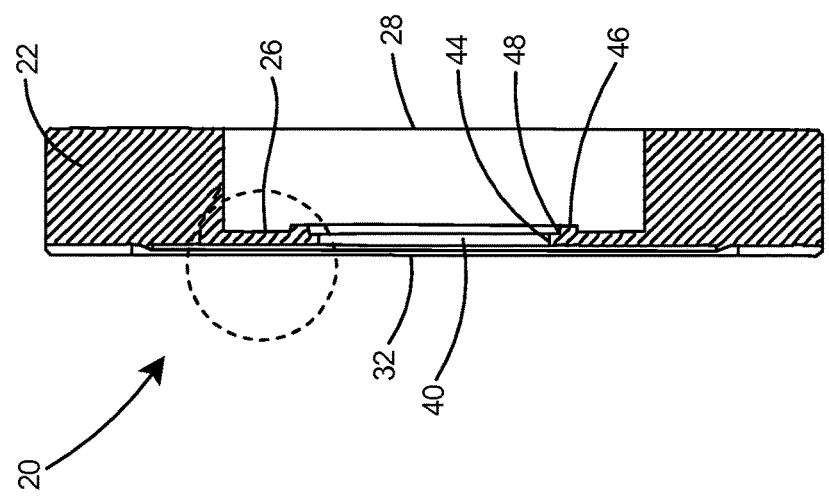
FIG. 5 is a sectional view of the diaphragm flange taken along line 5-5 of FIG. 3 and includes the welded in beam tube

Referring to FIGS. 5 and 6, the diaphragm flange 20 further includes an annular edge 44 around the opening 40 and an annular ring 46 outboard of the annular edge and forming an annular seat 48 adjacent the opening 40 for constraining the beam tube during welding. Preferably the thickness T1 of the diaphragm 26 is between 0.04 and 0.10 inch and more preferably between 0.05 and 0.09 inch. Most preferably the diaphragm 24 is between 0.06 and 0.08 inch in thickness. For use with a beam tube system having 2.0-inch tube diameter, the diaphragm flange 20 depicted in FIG. 6 will have an annular seat 48 preferably includes a width W2 of at least 0.325-inch and a depth D2 of at least 0.275-inch. The transition area 50 between the annular diaphragm 26 and the annular ring 46 and between the annular diaphragm 26 and the annular ring 22 is preferably rounded to a radius R1 of between 0.020-inch and 0.030-inch.

Figure 7:
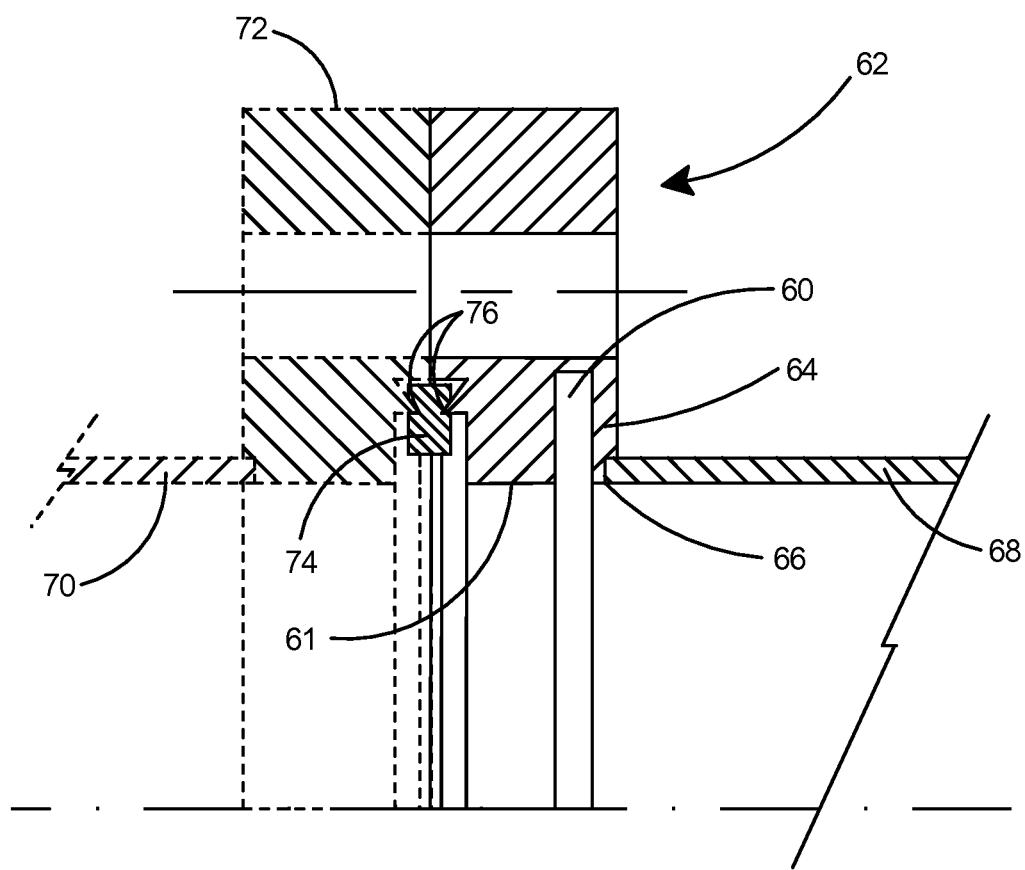
FIG. 7 is a sectional view of a second embodiment of a diaphragm flange according to the present invention where the diaphragm is formed by a annular groove into the standard CF flange with a tube welded to the inside of the diaphragm and the mating flange and tube shown in phantom.

With reference to a second embodiment of the invention in FIG. 7, by cutting a deep annular groove 60 into the inner periphery 61 at the inside diameter of the outer ring 62 of a CF flange 62, an integral diaphragm 64 is created that, when welded 66 to the tube 68 of the system beam tube, allows small angular motion, by elastic or inelastic deformation of the diaphragm, between the two tubes 68 and 70, a first tube 68 of which is depicted in FIG. 7 and a second tube 70 of which is depicted in phantom lines as welded to a conventional CF flange 72, held together by the flange pair. Most preferably, the diaphragm 24 is between 0.06 and 0.08 inch in thickness. The metallic gasket 74 at the knife-edges 76 is shown.

Figure 8:
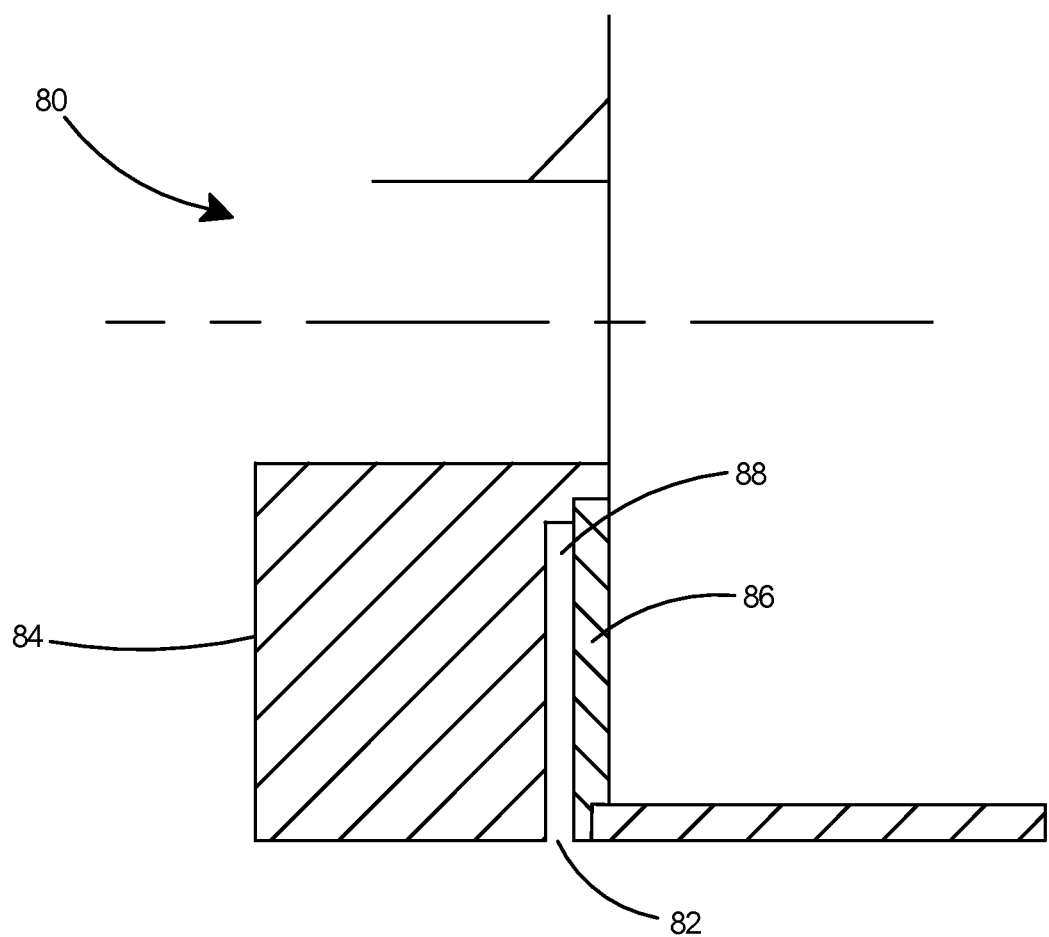
FIG. 8 is a sectional view of a third embodiment of a diaphragm flange where the diaphragm is formed by welding a thin disk to a standard flange. A vacuum tube is shown welded to the inner diameter of the disk.

Referring to the third embodiment in FIG. 8, if a thinner groove is required for electron beam impedance issues, the CF flange 80 is provided with a counter bore 82 in the tube end of the flange 84 which can be partially filled by a welded-in washer 86 that duplicates the diaphragm function. A very small slot 88 is provided adjacent the washer diaphragm 86. Most preferably, the washer diaphragm 86 is between 0.05 and 0.07 inch in thickness.

With reference to FIG. 9, if a thinner groove is unacceptable because of electron beam impedance issues, a fourth and preferred embodiment of the diaphragm flange 90 includes a tubular edge 92 on the integral diaphragm 94 where internal finger stock 96 is used to electrically bridge the gap 98. The tubular edge 92 in cross-section is substantially perpendicular to the integral diaphragm 94 and substantially parallel to the beam tube 99 and extends around the entire inner periphery 97 of the annular diaphragm 94. The other end of the finger stock 96 can also be used to bridge the gap 100 created where the copper gasket 102 seals the flange pair.

Any beam tube joints for high current, short pulse charged particle accelerators can be improved by providing a diaphragm flange as described hereinabove to allow small angular motion between the two tubes held together by the flange pair of the first embodiment. However this embodiment utilizes the next size up CF flanges. Adding an integral diaphragm to the CF Flange in the remaining embodiments eliminates the need to use next size up flanges for the beam tube joints.

The first three embodiments of this invention provide angular adjustment of the beam tubes with low impedance and no particulate generation. The fourth embodiment has the least beam impedance but the spring fingers do generate particles.

The present invention thus provides a method for reducing the wake field reflections and lowering particle beam impedance at connected beam tubes of a particle accelerator. With reference to FIGS. 3-7, the method includes:

a. providing a diaphragm flange 20 including an annular outer ring 22 having one or more bolt holes 24 and an inner periphery 61, a first side 28 having a flat surface 30, a second side 32 having a flat surface 34, and an opening 40 therein;

b. providing an annular diaphragm 26 integral with and extending from the inner periphery 61 of the outer ring 22; and c. providing the diaphragm with a thickness T1 (FIG. 6) that enables elastic or inelastic deformation of the diaphragm 26.

With reference to FIG. 9, the method further includes providing a tubular edge 92 extending around the inner periphery 97 of the annular diaphragm 94, the tubular edge 92 further reducing beam impedance for a particle beam passing through the diaphragm flange. The method further includes providing finger stock 96 extending around the inner periphery 97 of the annular outer ring 22, the finger stock 96 reducing the wake field and reducing beam impedance across the diaphragm flange 90.

The description of the present invention is presented for purposes of illustration and description, but is not intended to be exhaustive or limited to the invention in the form disclosed. Many modifications and variations will be apparent to those of ordinary skill in the art without departing from the scope and spirit of the invention. The embodiments herein were chosen and described in order to best explain the principles of the invention and the practical application, and to enable others of ordinary skill in the art to understand the invention for various embodiments with various modifications as are suited to the particular use contemplated.

What is claimed is:

1. A diaphragm flange, comprising:
    a. an annular outer ring including one or more bolt holes and an inner periphery;
    b. a first side having a flat surface a second side having a flat surface;
    c. an annular diaphragm integral with and extending from the inner periphery of the outer ring;
    d. an opening in said annular diaphragm; and
    e. finger stock extending around said inner periphery of said outer flange, said finger stock reducing the wake field reflections and reducing beam impedance across said diaphragm flange.

2. The diaphragm flange of claim 1, further comprising an annular ring outboard of the annular edge and forming an annular seat adjacent said opening.

3. The diaphragm flange of claim 1, further comprising a recessed surface on said second side of said diaphragm flange; and
    an annular knife-edge extending from said recessed surface.

4. The diaphragm flange of claim 3, further comprising a tubular edge extending around the inner periphery of the annular diaphragm.

5. The diaphragm flange of claim 4, further comprising a gap between said tubular edge and said outer flange; and internal finger stock bridging said gap.

6. The diaphragm flange of claim 5, wherein said tubular edge extends around the inner periphery of said outer ring.

7. The diaphragm flange of claim 6, further comprising
    a copper gasket disposed in said recessed surface of said diaphragm flange;
    a flange pair formed by said diaphragm flange and an adjacent flange;
    a gap between said flange pair; and
    said finger stock bridges said gap between said flange pair.

8. The diaphragm flange of claim 1, further comprising a leak check groove extending laterally across the annular outer ring.

9. The diaphragm flange of claim 1, wherein said diaphragm includes a thickness that enables elastic or inelastic deformation of the diaphragm.

10. The diaphragm flange of claim 1, wherein said diaphragm includes a thickness of between 0.04 inch and 0.10 inch.

11. The diaphragm flange of claim 1, wherein said diaphragm includes a thickness of between 0.05 inch and 0.09 inch.

12. The diaphragm flange of claim 1, wherein said diaphragm includes a thickness of between 0.06 inch and 0.08 inch.

13. The diaphragm flange of claim 1, further comprising
    a transition area between said annular diaphragm said annular outer ring;
    a transition area between said annular diaphragm and said annular outer ring; and
    said transition areas are rounded to a radius of between 0.020-inch and 0.030-inch.

14. A method for reducing the wake field reflections and lowering particle beam impedance at connected beam tubes of a particle accelerator, comprising:
    a. providing a diaphragm flange including an annular outer ring having one or more bolt holes and an inner periphery, a first side having a flat surface, a second side having a flat surface, and an opening therein;
    b. providing an annular diaphragm integral with and extending from the inner periphery of the outer ring; and
    c. providing the diaphragm with a thickness that enables elastic or inelastic deformation of the diaphragm.

15. The method of claim 14, further comprising providing a tubular edge extending around the inner periphery of the annular diaphragm, said tubular edge further reducing beam impedance for a particle beam passing through the diaphragm flange.

16. The method of claim 14, further comprising providing finger stock extending around said inner periphery of said annular outer ring, said finger stock reducing the wake field and reducing beam impedance across said diaphragm flange.

* * * * *